(No Model.)
H. A. LOMBARD & J. R. RANKIN.
VEHICLE SEAT LOCK.
No. 429,352. Patented June 3, 1890.
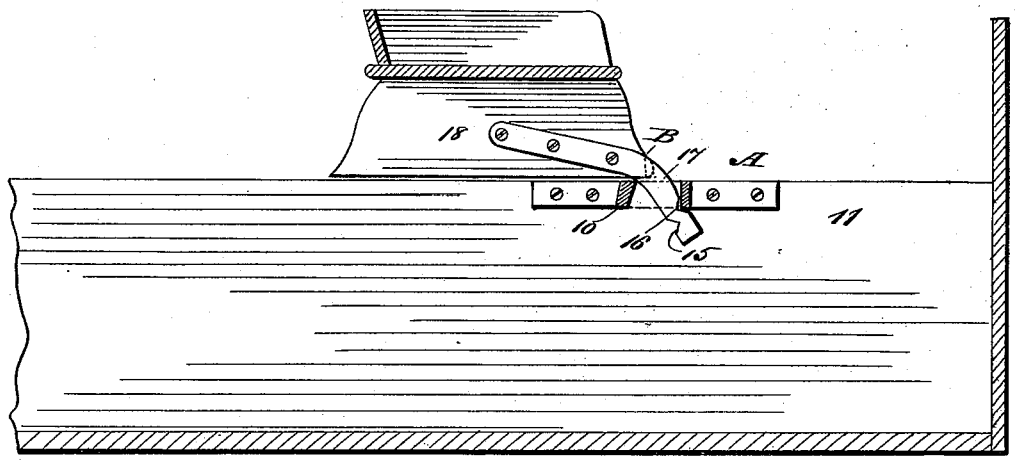
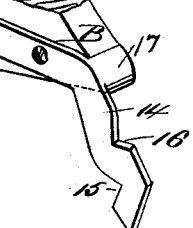
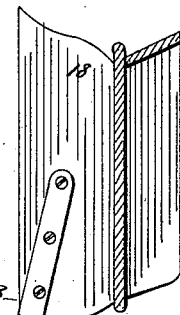
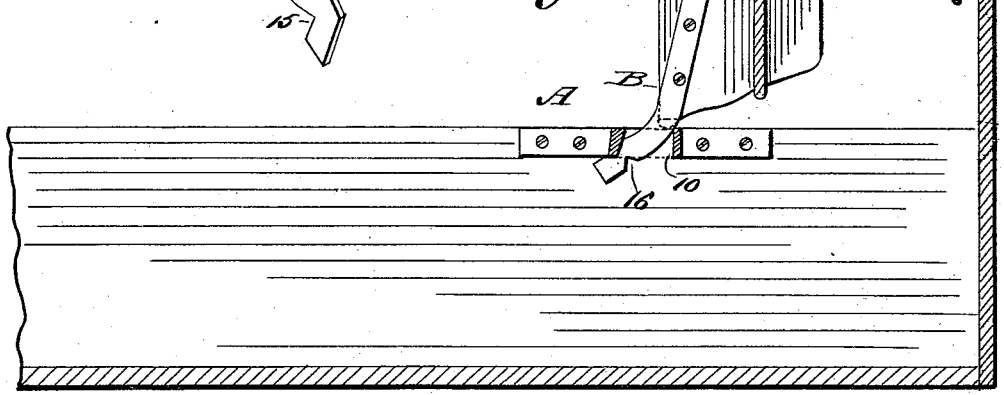
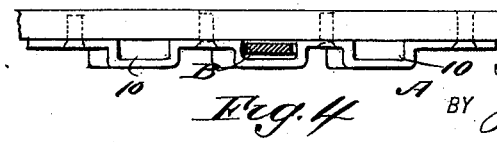
WITNESSES:
F. McArdle
E. Sedgwick
INVENTOR:
H. A. Lombard
J. R. Rankin
BY Munn & Co.
ATTORNEYS

UNITED STATES PATENT OFFICE.

HENRY A. LOMBARD, OF SACO, AND JOHN R. RANKIN, OF WELLS, MAINE.

VEHICLE-SEAT LOCK.

SPECIFICATION forming part of Letters Patent No. 429,352, dated June 3, 1890.

Application filed December 27, 1889. Serial No. 335,115. (No model.)

*To all whom it may concern:*

Be it known that we, HENRY A. LOMBARD, of Saco, in the county of York and State of Maine, and JOHN R. RANKIN, of Wells, in the same county and State, have invented a new and Improved Fastening Device for Vehicle-Seats, of which the following is a full, clear, and exact description.

Our invention relates to an improved fastening device for the seats of vehicles, and has for its object to provide a means whereby a seat may be conveniently and expeditiously placed in position without necessitating the operator passing between the wheels of the vehicle, and, when the seat is in position, whereby it may be easily and without disconnection tilted forward for the purpose of conveniently placing merchandise or persons in the vehicle, and also for the purpose of keeping the seat dry when not in use.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a vertical section through a seat and a portion of the vehicle-body, illustrating the seat in position upon said body. Fig. 2 is a similar view illustrating the seat in its upper or vertical position. Fig. 3 is a perspective view of the latch-lever detached; and Fig. 4 is a plan view of one side rail of a vehicle-body and the keeper attached thereto, the lock-latch being in transverse section.

The device is constructed in two parts— namely, a keeper A and a latch-lever B. The keeper consists of a metal plate having one or a series of loop-like sockets 10 formed therein, the said keeper being adapted for attachment to the inner face of the side rails 11 of the vehicle, as best shown in Figs. 1 and 4. Two keepers are employed upon each wagon-body—one located upon each side rail— the two keepers being in horizontal alignment. The said keepers are wider at the top than at the bottom, in order to give ample play to the latch-lever at the lower portion of the keeper and comparatively no play at the top.

The latch-lever B consists, preferably, of a flat bar of metal, the lower end whereof is curved downward, as best shown in Fig. 3, thus imparting to the lever somewhat of an angled contour. In the upper essentially-straight member 12 of the latch-lever a series of apertures 13 is produced, and in the under edge of the downwardly-curved lower member 14, near the bottom thereof, a notch or angular recess 15 is formed, and a similar recess or notch 16 is produced in the upper edge of the said curved member 14, the latter notch or recess being located at about the center of the member, as best illustrated in Fig. 3. The construction of the latch-lever is completed by the addition of a pin or spur 17, projected at a right angle from its inner face, the said spur or pin being located at the junction of the two members 12 and 14. Two latch-levers are employed for each seat, one latch-lever being secured to the inner face of each sill or support 18 of the seat, the attachment being effected by passing screws or similar devices through the apertures 13 of the upper essentially-straight member 12 of the levers.

In placing the seat upon the body of the vehicle the curved lower members of the latch-levers are made to enter transversely-opposite sockets 10 in the keepers A, whereupon the spurs or pins of the latch-levers are made to rest upon the upper edge of the rails 11 of the body, as best shown in Fig. 4, constituting thereby a fulcrum upon which the levers turn in throwing the seat upward to the vertical position illustrated in Fig. 2. When the seat is in the horizontal position shown in Fig. 1, the walls of the upper notch or recess 16 are brought into engagement with the bottom of the forward wall of the socket in which the lever is entered. Thus the seat is retained effectually in a position for occupancy. When it is desired to throw the seat upward to the vertical position illustrated in Fig. 2, the levers, as heretofore stated, are supported when thrown forward by the bearing of the pins or spurs upon the rails of the vehicle, and the seat is held in the vertical position by the walls of the lower recess or notch contacting with the bottom of the rear wall of the socket 10.

It will be readily understood that when more than one socket is formed in the keeper the position of the seat may be shifted to the front or to the rear, as may be desired. It will be further observed that the device is very simple and durable in construction, and that it is capable of attachment to any vehicle-body comprising, as heretofore stated, but two pieces—namely, a keeper and a latch-lever.

Having thus described our invention, we claim as new and desire to secure by Letters Patent—

1. In a locking device for vehicle-seats, the combination, with a keeper provided with sockets, of a latch-lever having one end curved downward and provided with angular notches or recesses in the upper and lower edges of the curved member, and a pin or spur integral with the inner face of the said lever, substantially as shown and described.

2. In a locking device for vehicle-seats, the combination, with a keeper having a series of sockets formed therein, of a latch-lever bent to form an essentially-straight section and a downwardly-curved section, the downwardly-curved section being provided with angled notches or recesses in its upper and lower edges, and a spur or pin integral with the inner face of the said lever at the junction of the two members, substantially as and for the purpose specified.

3. The combination, with the side rails, of a vehicle-body having recesses formed in its upper edge and keepers attached to the said side rails provided with a series of sockets, one socket being located near each recess of the rails, of a latch-lever bent to form an essentially-straight section adapted for attachment to the seat and a downwardly-curved member capable of entering the sockets of the keeper, the said downwardly-curved member being provided with angled recesses or notches in its upper and lower edges, and a pin integral with the inner face of the lever at the junction of the two members, said pin being adapted to enter a recess in one of the said side rails of the body, substantially as and for the purpose specified.

HENRY A. LOMBARD.
JOHN R. RANKIN.

Witnesses:
FERDINAND W. GUPTELL,
HAMPDEN FAIRFIELD.